United States Patent [19]

Ripplinger

[11] Patent Number: 4,933,583
[45] Date of Patent: Jun. 12, 1990

[54] ROTOR HAVING BALANCE WEIGHTS

[75] Inventor: Walter Ripplinger, Rheinhausen, Fed. Rep. of Germany

[73] Assignee: Frankl & Kirchner Gmbh & Co. KG Fabrik fur Electromotoren u. electrische Apparate, Schwetzingen, Fed. Rep. of Germany

[21] Appl. No.: 321,430

[22] Filed: Mar. 9, 1989

[30] Foreign Application Priority Data

Mar. 12, 1988 [DE] Fed. Rep. of Germany ....... 3808311

[51] Int. Cl.[5] .................. H02K 21/12; H02K 5/24; H02K 1/22; F16F 15/22
[52] U.S. Cl. .................................. 310/156; 310/51; 310/261; 74/573 R
[58] Field of Search .................. 310/42, 51, 156, 261; 74/573 R, 574; 73/458, 461, 468, 469, 470

[56] References Cited

U.S. PATENT DOCUMENTS

| 4,433,261 | 2/1984 | Nashiki et al. | 310/156 |
| 4,633,113 | 12/1986 | Patel | 310/156 |
| 4,725,750 | 2/1988 | Welch | 310/156 |
| 4,742,259 | 5/1988 | Schaefer et al. | 310/156 |
| 4,746,827 | 5/1988 | Ochiai et al. | 310/156 |

FOREIGN PATENT DOCUMENTS

| 1942855 | 3/1970 | Fed. Rep. of Germany . | |
| 2636167 | 2/1978 | Fed. Rep. of Germany | 73/468 |
| 3013704 | 12/1981 | Fed. Rep. of Germany | 73/468 |
| 8414847 | 8/1984 | Fed. Rep. of Germany . | |
| 193954 | 11/1982 | Japan | 73/458 |
| 273154 | 12/1986 | Japan | 310/261 |
| 63-1355 | 1/1988 | Japan | 310/261 |
| 415816 | 1/1967 | Switzerland . | |
| 2146179 | 4/1985 | United Kingdom . | |

Primary Examiner—Patrick R. Salce
Assistant Examiner—C. LaBalle
Attorney, Agent, or Firm—Felfe & Lynch

[57] ABSTRACT

A rotor for an electric motor, energized by a permanent magnet, has an essentially cylindrical rotor body (1), with shaft sections (7, 8) coaxially distant from the rotor body (1). Permanent magnets (21) are fastened to the outer periphery (16) of the rotor body (1). In order to counterbalance the rotor, balance weight rings (6), in which weights (26) are inserted and which are disposed on seat sections (5) formed on the rotor body (1), are mounted on the rotor body (1).

10 Claims, 1 Drawing Sheet

4,933,583

ROTOR HAVING BALANCE WEIGHTS

BACKGROUND OF THE INVENTION

The invention relates to a rotor having an essentially cylindrical rotor body with permanent magnets on the cylindrical outer surface thereof.

Such rotors usually are subjected to very high rotational speeds and, with that, to high centrifugal forces. For this reason, these rotors must, on the one hand, be counterbalanced very carefully. On the other, it must be possible to counterbalance them in a very simple manner.

SUMMARY OF THE INVENTION

It is therefore an object of the invention to provide means for counterbalancing the rotor of the generic type in a particularly simple manner.

The object is achieved by providing seat sections integral with the rotor body, and by providing balance weight rings on the seats, the rings accommodating balance weights.

Balance weight rings can be mounted and fixed in a very simple manner on an imbalance measuring machine after measuring the otherwise completely mounted rotor.

By immediately adjoining the seat sections to the end faces, it is achieved that the balance weight rings can be brought very close to the rotor body, that is, directly into the region of the original imbalances. By placing each balance weight directly against the respective end face, an exact axial positioning and fixing of the balance weight rings is achievable without requiring a special effort.

The mass of each weight is chosen according to the rotor imbalance measured. It is inserted in originally specified and always the same balance weight rings and permanently disposed in the balance weight ring without being able to fall out after its installation by accommodating each weight in a truncated conical recess in a balance weight ring, it is without requiring a separate immobilization. This is accomplished only by the construction of the balance weight ring and of the rotor.

By using elastic for the balance weight rings, it is achieved that the balance weight rings themselves are as light as possible and thus, on the whole, do not increase the angular momentum of the rotor significantly. Because of the generally given elastic deformability of the synthetic material, a permanent, nonrotating press fit of the balance weight ring on the corresponding seat sections of the rotor is thus easily attainable. By dimensioning all weights the same regardless of mass, a firm seat in the recess of the balance weight ring is always guaranteed.

By providing the balance weight rings with openings for receiving a key to effect their removal, a subsequent correction of the counterbalance becomes possible in a simple manner.

The counterbalancing with the inventive measures can be employed particularly advantageously in the case of rotors protected with a protective metallic sheath. The details relating to this are given in claims 9 and 10.

Further advantages and characteristics of the invention arise out of the following description of an example of the operation by means of the drawing.

DETAILED DESCRIPTION OF THE DRAWING

Figure 1:
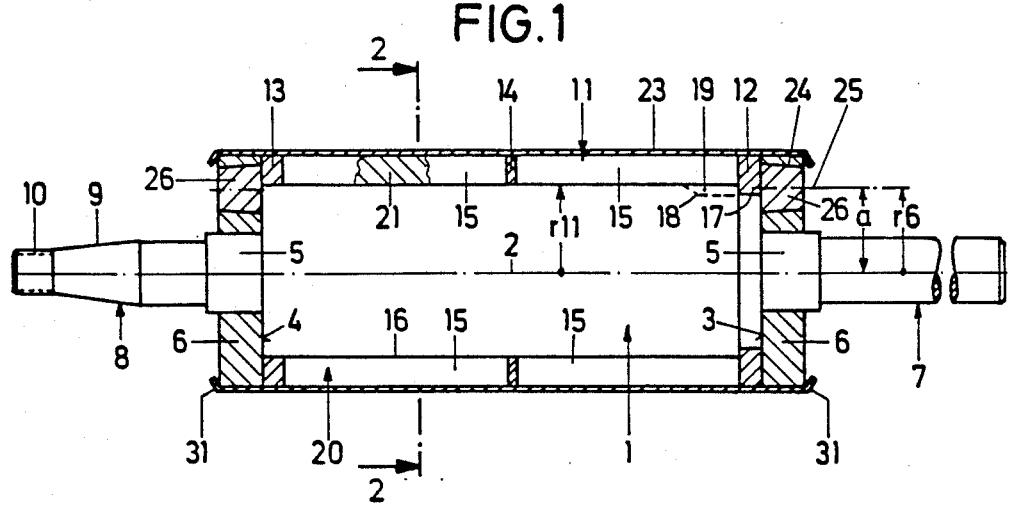
FIG. 1 shows a longitudinal section through a rotor with balance weight rings and protective sheath.
Figure 2:
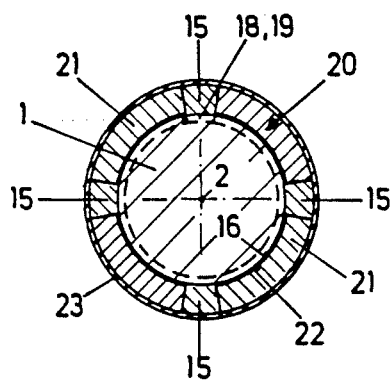
FIG. 2 shows a cross section through the rotor along the section line II—II of FIG. 1.

The rotor has in the usual manner a cylindrical rotor body 1, which is constructed concentrically with a central longitudinal axis 2. Concentrically with this axis 2 are the two plane end faces 3,4 of the rotor body 1 and in one piece with the latter cylindrical seat sections 5 for the disk-shaped balance weight rings 6. Adjoining the two seat sections 5 in the usual manner are shaft sections 7, 8. On the one shaft section 8 on the output side, a conical section 9 is formed to accommodate an output wheel, for example, a pulley, and the conical section 9 is followed by a threaded section 10. A squirrel cage 11 is disposed on the rotor body 1. It consists of two end rings 12, 13 and a center ring 14, which are connected together by four longitudinal ridges 15, which run parallel to the axis 2. This squirrel cage 11 is constructed in one piece. It lies flush on the cylindrical outer surface 16 of the rotor body 1. So that this squirrel cage 11 may be fixed axially on the rotor body 1, the latter is provided in the region of its end face 3 with an annular recess 17, which is engaged by the appropriately larger constructed, that is, radially inwards projecting end ring 12. In addition, the outer surface 16 of the rotor body 1 is provided in the region of this annular recess 17 with a positioning groove 18, which runs parallel to the axis 2 and is engaged by an appropriate spring-like projection 19 of a longitudinal ridge 15 of the squirrel cage 11, so that the latter, relative to the rotor body 1, has a defined angular position that is secured against twisting.

In the compartments 20 of the squirrel cage 11, which are formed by the rings 12 and 14 or 13 and 14 and in each case two longitudinal ridges 15, are disposed permanent magnets 21 in the shape of cylindrical sections. They are attached to the outer surface 16 of the rotor body 1 with a layer of adhesive 22.

Over the squirrel cage 11 with glued-in permanent magnets 21, an essentially cylindrical protective sheath of nonmagnetic material, such as aluminum or chromium-nickel steel is fastened by heat shrinking, that is, the protective sheath 23 is expanded by heating and then pushed on. Instead of being heat shrunk, the protective sheath can, of course, also be pushed onto the squirrel cage. After cooling, it is firmly attached to the rotor body 1 with the permanent magnets 21 and secured these additionally against being flung out partially or completely. Since the permanent magnets 21 are flush with the rings 21 to 14 and the longitudinal ridges 15, the inner surface of the protective sheath 23 lies uniformly against the squirrel cage 11 and the permanent magnets 21.

Figure 3:
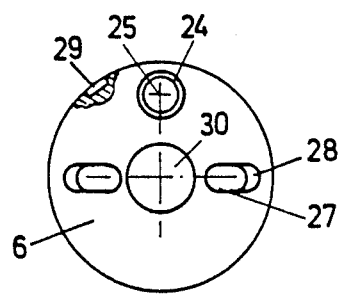
FIG. 3 shows a plan view of a balance weight ring.

The balance weight rings 6 are provided to counterbalance this unit. As is evident from FIGS. 1 and 3, they have a recess 24 in the shape of a truncated cone, the center axis 25 of which runs parallel to the axis 2. Within the realm of constructive possibilities, the radial distance "a" between the balance weight ring 6 and the axis 2 is as large as possible; the recess 24 thus is quite far towards the outside in the balance weight ring 6. The radius r6 of the balance weight ring 6 corresponds essentially to the radius r11 of the squirrel cage, that is, the outside of the balance weight rings 6 lies approximately flush with the squirrel cage 11 and thus also against the inside of the protective sheath 23. A weight 26 in the shape of a truncated cone is inserted into the recess 24 having the shape of a truncated cone. The outer shape of the weight 26 thus corresponds to that of the recess 24. Transversely to the recess 24, each balance weight ring 6 is provided with contacting openings 27 for a fork-shaped key, the openings 27 lying on a common diameter. On the side facing the respective end faces 3 or 4 of the rotor body 1, the contacting openings 27 have an undercut 28 extending radially to the outside. Into the contacting openings 27, an appropriate fork-shaped key with radially outwards protruding hooks can be inserted to engage the undercuts 28, so that the balance weight ring on the cylindrical seat section 5 can be twisted onto this or pulled off it. In the assembled state, the truncated cone-shaped recess 24 widens towards the respective end faces 3 or 4 of the rotor body 1. Alternatively, the recesses may also be constructed as blind holes, which are open towards the respective end face 3 or 4 of the rotor body 1. On the outer periphery, each balance weight ring 6 has an indentation 29.

The counterbalancing of the rotor proceeds as follows. After the protective sheath 23 is mounted, that is, shrunk on, the rotor without the balance weight ring 6 is measured on a balance measuring machine, the imbalances at either end of the rotor body, that is, in the regions in which the balance weight rings 6 are to be affixed, being measured. Subsequently, two balance weight rings are provided with weights 26, and moreover in proportion to the measured imbalance. These weights 26 in each case have the same shape and consist of materials of different densities. The interior of the weights may be hollow. In this way, a fine gradation of the mass of the weights 26 may be attained. Following thereon, the two balance weight rings 6, provided with weights 26, are pressed onto the cylindrical seat sections 5 in the angular attitude specified in each case by the measurement. The dimensions of these seat sections 5 on the one hand and of the corresponding cylindrical seat boreholes 30 of the balance weight rings 6 are such, that the balance weight rings 6 are seated without clearances, that is, with a slight press fit, on the seat sections 5. Since the balance weight rings 6 generally are produced from the lightest possible synthetic material, which usually is elastic, such a firm seat can be established or detached once again without employing excessive pressing-on or pulling-off forces. The balance weight rings 6 lie close to the respective end face 3 or 4. The same is true for the weights 26, which thus are also seated securely in the respective recess 24, since the recess 24 and the weight 26 widen towards the respective end face 3 or 4. Subsequent corrections are made with the aforementioned fork-shaped key and the contacting openings 27. The protective sheath 23, projecting slightly in the axial direction beyond the respective balance weight ring 6, is flanged radially towards the inside, so that the balance weight rings 6 are additionally secured in the axial direction by these flanged edges 31. The protective sheath 23 is then deformed into the depression 29, so that an additional safeguard against twisting of the balance weight rings 6 is achieved.

I claim:

1. A rotor for an electric motor, said rotor comprising
an essentially cylindrical rotor body having a central longitudinal axis, an essentially cylindrical outer surface concentric to said axis, axially opposed end faces, and a pair of axially opposed seat sections integral with said rotor body,
permanent magnets disposed on said outer surface,
balance weight rings disposed on said seat sections concentrically with said axis and adjacent to respective end faces, each said balance weight ring having a recess which flares to an opening facing the adjacent end face, and
balance weights accommodated in respective recesses, said weights each having an external shape which conforms to the respective recess.

2. The rotor of claim 1, wherein each seat section (5) immediately adjoins the respective end face (3, 4) of the rotor body (1).

3. The rotor of claim 2, characterized in that each balance weight ring (6) lies directly against the respective end face (3, 4).

4. The rotor of claim 1, characterized in that each recess (24) is formed in the shape of a truncated cone.

5. The rotor of claim 1, wherein balance weight rings (6) consist of an elastic, synthetic material.

6. The rotor of claim 1, characterized in that the external shape of all weights is the same regardless of weight.

7. The rotor of claim 1, wherein balance weight rings (6) are provided with contacting openings (27) for twisting and/or pull-off keys.

8. The rotor of claim 1 further comprising means for retaining each balance weight ring against the adjacent end face, whereby said balance weights are retained in the respective recesses.

9. The rotor of claim 1 further comprising, a protective metal sheath provided concentrically about said permanent magnets and at least partially overlapping the balance weight rings in the axial direction, said sheath being positively connected to said balance weight rings.

10. The rotor of claim 9 wherein the protective sheath (23) is connected with each balance weight ring (6) by means of a flanged edge (31).

* * * * *

UNITED STATES PATENT AND TRADEMARK OFFICE
CERTIFICATE OF CORRECTION

PATENT NO. : 4,933,583

DATED : June 12, 1990

INVENTOR(S) : Walter Ripplinger

It is certified that error appears in the above-identified patent and that said Letters Patent is hereby corrected as shown below:

Column 2, line 52, delete "secured" and insert -- secures --.

Signed and Sealed this

Twenty-fifth Day of August, 1992

*Attest:*

DOUGLAS B. COMER

*Attesting Officer*   Acting Commissioner of Patents and Trademarks